United States Patent  [11] 3,624,170

| [72] | Inventors | Satoshi Wakiyama;<br>Kanichi Uchida, both of Yamaguchi-ken, Japan |
|---|---|---|
| [21] | Appl. No. | 628,559 |
| [22] | Filed | Apr. 5, 1967 |
| [45] | Patented | Nov. 30, 1971 |
| [73] | Assignee | Toyo Soda Mfg. Co., Ltd.<br>Yamaguchi-ken, Japan |
| [32] | Priority | Sept. 16, 1966 |
| [33] | | Japan |
| [31] | | 41/61159 |

[54] PROCESS FOR OXYCHLORINATION OF ETHYLENE
5 Claims, No Drawings

[52] U.S. Cl. .................................................. 260/659, 252/441
[51] Int. Cl. ......................................................... B01j 11/78, C07c 17/02
[50] Field of Search ............................................. 260/659

[56] References Cited
UNITED STATES PATENTS

| 3,010,913 | 11/1961 | Price | 260/659 A |
|---|---|---|---|
| 3,190,931 | 6/1965 | Laine et al. | 260/659 A |
| 3,345,422 | 10/1967 | Piester et al. | 260/659 A |

FOREIGN PATENTS

| 695,895 | 10/1964 | Canada | 260/659 |

Primary Examiner—Leon Zitver
Assistant Examiner—Joseph A. Boska
Attorney—Wenderoth, Lind & Ponack ABSTRACT: There is provided an improvement in the process for the catalytic gas phase oxychlorination of ethylene. The process comprises reacting ethylene, hydrogen chloride and a member of the group of air and oxygen in an iron-type reactor to produce, 1,2-dichloroethane. The improvement of the invention relates to conducting the reaction at a temperature of about 220° C. to about 300° C. and in the presence of a catalyst supported on an inert porous carrier and comprising copper, sodium and magnesium in an atomic ratio of Cu:Na:Mg of 1:0.2 to 0.7:0.3 to 1.5. The novel catalyst compositions are also provided.

PROCESS FOR OXYCHLORINATION OF ETHYLENE

SPECIFICATION

The present invention relates to a process for the oxychlorination of ethylene which comprises conducting the said oxychlorination reaction with a mixed gas of ethylene, hydrogen chloride and air or oxygen utilizing a reactor of iron type material such as stainless steel in order to produce 1,2-dichloroethane. More particularly, the invention relates to the process wherein a catalyst supported by an inert porous carrier is employed. The catalyst comprises a composition of a copper, sodium and magnesium salt, having an atomic ratio of 0.2 to 0.7 sodium and 0.3 to 1.5 magnesium in proportion to one atom of copper. The reaction is carried out in the temperature range of 220° C. to 300° C. The invention also relates to the novel catalyst composition which is affected to a lesser degree than conventional catalysts by a component of an iron salt sublimated and effused from the inside wall of the said reactor vessel.

Hithertofore it has been well known that a catalyst supported by an inert porous carrier such as activated alumina, silica gel, pumice, diatomaceous earth or active carbon in combination with cupric chloride is effective for oxychlorination of hydrocarbons such as ethylene. In the case of using a carrier in combination with cupric chloride alone, the copper component is lost by volatilization, resulting in the deterioration of the catalytic activity at the high temperatures (ranging from 200° C. to 500° C.) at which the oxychlorination reaction is conducted. Thus, an alkaline metal chloride such as potassium chloride has been previously added for preventing the said catalyst deterioration. Simultaneously, it has been proposed to add the salts of rare earth elements, titanium, zirconium, thorium and uranium for the purpose of preventing the loss of the copper component by volatilization and further increasing the catalytic activity.

Moreover, the reaction temperature range is necessarily specified to fall within the range which conforms to those catalysts.

In other words, from the viewpoint of the general efficiency of catalyst, a low temperature gives a slow reaction velocity and a high temperature causes a high reaction velocity, resulting in an acceleration of the secondary reaction velocity simultaneously and a poor selectivity for obtaining the objective reaction product.

Furthermore, accordingly as the higher temperature is used, the efficiency of the catalyst is progressively deteriorated. From the standpoint of the selection of reactor material described subsequently as well as the catalytic components, it is desired to carry out the reaction at a lower temperature, in so far as an economically satisfactory reaction velocity may be obtained at such low temperature.

Nickel and stainless steel or the like have been considered as reactor materials for the industrial apparatus in conformity with the materials generally used in the present reaction. Nickel is superior from the standpoint of anticorrosion but an iron-type material such as stainless steel is preferably chosen considering the economical advantages of such materials. However, when an iron type of reactor is employed, the composition of the catalyst and a reaction temperature must be closely examined. In particular, when a catalyst of oxychlorination provided hithertofore is employed, there occurs a hindrance in the operation, as described below.

Namely, when using a catalyst of oxychlorination provided hithertofore, for example, a catalyst of an activated alumina together with a mixture of cupric chloride and potassium chloride or a uranium compound at a reaction temperature of 220° C. to 300° C. in the iron-type reactor, e.g. stainless steel, and carrying out the said reaction of ethylene oxychlorination for a continuous period of 1 month, a slight deterioration of catalytic activity was recognized as a result and a resistance of permeability (a pressure difference) was increasingly noticed. The increase of the said pressure difference appears so conspicuously as to disable a continuous operation over a long period. After terminating the operation, the catalyst was taken out of the reactor and was examined. Such examination disclosed that the disability of operation was caused by disintegration and pulverization of the said catalyst. The degree of pulverization reached several percent of the initially charged amount.

Furthermore, the phenomenon of disintegration for the said catalyst was examined precisely. This examination disclosed that s small amount of $Fe_2Cl_6$ sublimated in the iron-type reactor, was adsorbed on the catalyst and this resulted in the disintegration. This is also established by the following experiment:

This type of catalyst containing adsorbed $Fe_2Cl_6$ individually was employed in a quartz tubular reactor free from the effect of the iron component in carrying out the reaction of ethylene oxychlorization. Disintegration of the said catalyst occurred within 24 hours.

Moreover, the phenomenon of disintegration for this type of catalyst was not avoided even when using silica gel, diatomaceous earth, active carbon and activated alumina, as a carrier for supporting the catalyst. Thus, the use of this type of catalyst in the iron-type reactor for performing the reaction of ethylene oxychlorination was established as inappropriate, so that research was carried out seeking an efficacious catalyst.

Such research resulted in the discovery of the present process of ethylene oxychlorination for producing 1,2-dichloroethane by using the iron-type reactor in a type of fixed bed and in the discovery of a novel and highly efficient catalyst which does not cause the phenomenon of disintegration affected by the aforesaid component of iron salt.

The present invention comprises the use of a catalyst having the three components copper, sodium and magnesium. In such a catalyst, the deterioration by volatilization of the copper component is prevented and the selectivity for 1,2-dichloroethane is superior in a wider range of temperature. Furthermore, the disintegration of catalyst due to the effect of $Fe_2Cl_6$ in the reactor, and the deterioration of selectivity and activity, are controlled by use of the catalyst.

Of course, certain combinations of components from copper, sodium and magnesium, namely a combination of copper and sodium or of copper and magnesium is already well known for use as a catalyst in the process of oxychlorination. But a process which comprises the use of an iron-type reactor and a mixture of copper, sodium and magnesium having the specified composition and under the most optimum conditions of temperature in order to provide the catalytic efficiency indicating the superior activity and selectivity is an entirely novel invention.

The catalyst composition of the present invention achieves an even greater efficiency by supporting it on a carrier having an appropriate specific surface area, e.g. a porous carrier such as activated alumina, silica gel, pumice, diatomaceous earth, active carbon or the like.

The specific surface area of the carrier should be in the range of 150 to 400 m.²/g. and a molding carrier having a combination of micropore and macropore is preferable.

The catalyst in accordance with the process of the present invention is not limited to chlorides of copper, sodium and magnesium, but any water-soluble substance which possesses catalytic action in the reaction system for oxychlorination may be used.

For example, a copper component in the form of a nitrate or a formate may be supported by the carrier in the solution. But, generally speaking, the catalyst in a form of a chloride is preferably chosen for supporting it with the carrier.

To prepare the catalyst, a carrier of activated alumina is immersed in an aqueous solution containing a mixture of cupric chloride, sodium chloride and magnesium chloride and the adsorption of the solution by the said carrier is effected. The said carrier is removed from solution after filtering the solution and is dried at 200° C. in a dryer for 4 hours. The carrier is then ready for use.

It is preferred that the amount of copper component contained in the catalytic composition on the carrier be in the range of 2 percent to 10 percent by weight based on copper metal. The sodium and magnesium are preferably chosen in the range of 0.2 to 0.7 and 0.3 to 1.5 atomic weight respectively, to one atomic weight of copper component. In excess to the above ranges, the catalytic efficiency will be deteriorated both from the standpoint of activity as well as selectivity.

When the present catalyst is employed in a stainless steel reactor under conditions of long, continuous operation, a superior selectivity of 1,2-dichloroethane is indicated at a temperature range of 220° C. to 330° C. and the increase of pressure differences among the layers of catalyst is not noticeable. In case a reaction temperature below 220° C. is chosen, the catalytic activity is deteriorated and a byproduct such as ethyl chloride is increasingly produced. In excess of a temperature of 300° C., a yield of heavy matter components such as trichloroethane is undesirably increased.

When the present catalyst is used, the pressure-of-reaction system in the range of maintaining the supplied raw materials and the produced substances in a gaseous state is unquestionably chosen and the said pressure is desirably chosen in the range of 0 to 10 kilograms per square centimeter gauge (kg/cm.$^2$ g.).

In order that the essential features of the present invention be understood, the following of the examples are set forth and explained.

The reactor in the examples is a straight tube of stainless steel of 27.8 mm. inside diameter and 1500 mm. in length SUS-27 (18Cr–8Ni–Stainless Steel) and the entire body of the said stainless steel tube is welded with a jacket by providing a 2-inch-diameter gas pipe and the said jacket is a vertical-type apparatus in which an organic liquid thermal medium is able to recirculate.

Into the central part of the said stainless steel tube, another stainless steel tube of 8 mm. outside diameter equipped with an Alumel-chromel thermocouple is inserted through the bottom end of the reactor to enable the measurement of the temperature at each portion of the reaction bed. Pressure gauges are supplied at the entry and outlet of the reactor so as to enable the measurement of the variation of fluidity resistance.

A reaction raw material gas is introduced from the top end of reactor and, as it proceeds downward, it is contacted with particles of the catalyst and the reaction is carried out.

The reacted gas is introduced from the bottom end to the outside of the reactor and is cooled in two steps of "−30° C." and "−60° C.," whereby the condensable reaction product is completely condensed and a condensate and a noncondensable gas are analyzed by a conventional process of gas chromatography

EXAMPLE I

The catalyst was prepared by employing a molding product of commercially activated alumina as the carrier in accordance with the conventional immersion process.

The employed carrier was of a diameter of 6 mm. to 7 mm., with a specific surface area of 280 m.$^2$/g. and a water absorption rate of 0.42 cc./g.

The produced catalysts were of five types: $CuCl_2$-KCL-type, $CuCl_2$-type, $CuCl_2$-$MgCl_2$-type, $CuCl_2$-NaCl-type and $CuCl_2$-$MgCl_2$-NaCl-type. The catalyst of $CuCl_2$-KCl-type employed in experiment 1 was prepared by dissolving 67.3 g. of cupric chloride dihydrate salt and 14.6 g. of potassium chloride in 200 cc. distilled water. 200 cc. of the carrier of activated alumina were immersed in the resultant solution at 25° C. for 1 hour and the substance obtained after filtering the resultant solution was dried at 200° C. for 4 hours.

The resultant catalyst composition consisted of 5.18 percent by weight of copper and 1.34 percent by weight of potassium (Atomic ratio K/Cu=approx. 0.42).

Following a similar process, cupric chloride dihydrate salt, sodium chloride and magnesium chloride were used and the various kinds of catalysts were prepared. The compositions of the prepared catalysts are set forth below:

a. The catalyst of $CuCl_2$ in experiment 2 contained 5.43 percent by weight of Cu;

b. The catalyst of $CuCl_2 \cdot MgCl_2$ in experiment 3 contained 5.43 percent by weight of Cu and 1.54 percent by weight of Mg (Atomic ratio Mg/Cu=approx. 0.75);

c. The catalyst of $CuCl_2 \cdot NaCl$ in experiment 4 contained 5.62 percent by weight Cu and 0.75 percent by weight of Na (Atomic ratio for Na/Cu=approx. 0.37).

Experiments 5 to 10 employed a catalyst of $CuCl_2 \cdot MgCl \cdot NaCl$.

1. Experiment 5 employed a catalyst containing 4.86 percent by weight Cu, 1.39 percent by weight Mg and 0.75 percent by weight of Na (Atomic ratio Cu : Mg : Na=1 : 0.57 : 0.43);

2. Experiment 6 employed a catalyst containing 4.68 percent by weight Cu, 0.81 percent by weight Mg and 1.02 percent by weight of Na (Atomic ratio Cu : Mg : Na=1 : 0.45 : 0.6);

3. Experiment 7 employed a catalyst containing 4.61 percent by weight Cu, 2.12 percent by weight Mg and 0.33 percent by weight of Na (Atomic ratio Cu : Mg : Na=1 : 1.2 : 0.2);

4. Experiment 8 employed a catalyst containing 4.52 percent by weight Cu, 0.26 percent by weight Mg and 1.31 percent by weight of Na (Atomic ratio Cu : Mg : Na=1 : 0.15 : 0.8);

5. Experiment 9 employed a catalyst containing 4.21 percent by weight Cu, 2.90 percent by weight Mg and 1.52 percent by weight of Na (Atomic ratio for Cu : Mg : Na=1 : 1.8 : 1.0); and 6. Experiment 10 employed a catalyst containing 4.91 percent by weight Cu, 0.28 percent by weight Mg and 0.09 percent by weight of Na (Atomic ratio for Cu : Mg : Na=1 : 0.15 : 0.05).

For each experiment, the above catalysts were mixed for dilution with 20 percent by volume of a 6 mm. to 7 mm. diameter fused alumina material and 750 cc. of the resultant mixture were charged in the reactor for carrying out the reaction. The raw material gases for the reaction, namely ethylene (15 l/hr.) hydrogen chloride (30 l/hr.) and air (45 l/hr.) were provided at the specified rates of flow and were mixed together. The pressure in the reactor was controlled at 2 kg./cm.$^2$ G. at the outlet by a pressure regulator on the outlet of the reactor. The temperature of the thermal medium inside the jacket was regulated during the experiment and thereby the reaction temperature was maintained at 280° C. as the maximum temperature in the catalyst layers.

The testing results are indicated in the following tables:

TABLE 1

| | Experiment Number | | | | | | | | | |
|---|---|---|---|---|---|---|---|---|---|---|
| | 1 | 2 | 3 | 4 | 5 | 6 | 7 | 8 | 9 | 10 |
| | Kinds of catalyst | | | | | | | | | |
| Items for the conditions | Cu-K | Cu | Cu-Mg | Cu-Na | Cu-Mg-Na | | | | | |
| The conditions for the initial step of reaction: | | | | | | | | | | |
| 1. Conversion rate of ethylene (percent) | 98.5 | 98.8 | 98.4 | 97.8 | 98.5 | 98.3 | 98.8 | 95.2 | 94.2 | 98.9 |
| 2. Selectivity for 1,2-dichloroethane (percent) ethylene basis | 97.5 | 97.0 | 96.8 | 97.2 | 97.5 | 97.7 | 97.4 | 97.3 | 97.2 | 97.0 |
| 3. Selectivity for ethylchloride (percent) (ethylene basis) | 0.2 | 0.2 | 0.2 | 0.3 | 0.1 | 0.1 | 0.1 | 0.3 | 0.4 | 0.2 |
| 4. Selectivity for other chlorides (percent) (ethylene basis) | 1.1 | 1.3 | 1.5 | 1.2 | 1.2 | 1.1 | 1.2 | 1.4 | 1.3 | 1.3 |
| 5. Selectivity for carbon monoxide plus carbon dioxide (percent) (ethylene basis) | 1.2 | 1.5 | 1.5 | 1.3 | 1.2 | 1.1 | 1.3 | 1.0 | 1.1 | 1.5 |
| 6. Iron component contained in catalysts (weight/percent) | 0.02 | 0.02 | 0.02 | 0.02 | 0.02 | 0.02 | 0.02 | 0.02 | 0.02 | 0.02 |

TABLE 2

| Items for conditions | Experiment Number | | | | | | | | | |
|---|---|---|---|---|---|---|---|---|---|---|
| | 1 | 2 | 3 | 4 | 5 | 6 | 7 | 8 | 9 | 10 |
| | Kind of catalyst | | | | | | | | | |
| | Cu-K | Cu | Cu-Mg | Cu-Na | Cu-Mg Na | | | | | |
| The conditions after one month: | | | | | | | | | | |
| 1. Conversion rate of ethylene (percent) | 98.1 | 97.8 | 98.0 | 97.8 | 98.5 | 98.3 | 98.9 | 98.3 | 92.4 | 98.0 |
| 2. Selectivity for 1,2-dichloroethane (percent) (ethylene basis) | 97.2 | 95.9 | 95.7 | 95.9 | 97.5 | 97.5 | 97.5 | 96.7 | 96.5 | 96.3 |
| 3. Selectivity for ethylchloride (percent) (ethylene basis) | 0.4 | 1.2 | 1.0 | 0.8 | 0.2 | 0.2 | 0.3 | 0.6 | 1.0 | 0.8 |
| 4. Selectivity for other chlorides (percent) (ethylene basis) | 1.2 | 1.4 | 1.8 | 2.0 | 1.2 | 1.2 | 1.2 | 1.4 | 1.5 | 1.4 |
| 5. Selectivity for carbon monoxide plus carbon dioxide (percent) (ethylene basis) | 1.2 | 1.5 | 1.5 | 1.3 | 1.1 | 1.1 | 1.0 | 1.3 | 1.0 | 1.5 |
| 6. Iron component contained in catalysts (weight-percent) | 1.20 | 1.07 | 1.11 | 1.17 | 1.31 | 1.26 | 1.11 | 1.03 | 1.42 | 1.09 |
| 7. Amount of disintegrated catalyst at random sampling (weight percent) | 5.0 | 1.2 | 0.7 | 1.0 | 0.2 | 0.2 | 0.3 | 0.2 | 0.2 | 0.8 |

EXAMPLE II

The catalyst of experiments 1 to 5 of example I were employed and the maximum temperature in the layers of catalyst was chosen as 220° C. The reaction time and other conditions were those of example I.

The testing results are set forth in the following table:

TABLE 3

| Items for the conditions | Experiment number | | | | | Items for the conditions | Experiment number | | | | |
|---|---|---|---|---|---|---|---|---|---|---|---|
| | 11 | 12 | 13 | 14 | 15 | | 11 | 12 | 13 | 14 | 15 |
| | Kinds of catalyst | | | | | | Kinds of catalyst | | | | |
| | Cu-K | Cu | Cu-Mg | Cu-Na | Cu-Mg-Na | | Cu-K | Cu | Cu-Mg | Cu-Na | Cu-Mg-Na |
| The conditions for the initial step of reaction: | | | | | | The conditions after one month: | | | | | |
| 1. Conversion rate of ethylene (percent) | 83.0 | 92.0 | 90.8 | 86.7 | 90.9 | 1. Conversion rate of ethylene (percent) | 63.7 | 81.3 | 74.9 | 65.1 | 80.8 |
| 2. Selectivity for 1,2-dichloroethane (percent) (ethylene basis) | 98.8 | 98.3 | 98.4 | 98.6 | 98.8 | 2. Selectivity for 1,2-dichloroethane (percent) (ethylene basis) | 97.9 | 97.2 | 97.3 | 97.9 | 98.0 |
| 3. Selectivity for ethylchloride (percent) (ethylene basis) | 0.2 | 0.3 | 0.3 | 0.3 | 0.2 | 3. Selectivity for ethylchloride (percent) (ethylene basis) | 1.1 | 1.3 | 1.4 | 0.8 | 1.0 |
| 4. Selectivity for other chlorides (percent) (ethylene basis) | 0.2 | 0.4 | 0.3 | 0.3 | 0.2 | 4. Selectivity for other chlorides (percent) (ethylene basis) | 0.2 | 0.5 | 0.3 | 0.3 | 0.2 |
| 5. Selectivity for carbon monoxide plus carbon dioxide (percent) (ethylene basis) | 0.8 | 1.0 | 1.0 | 0.8 | 0.8 | 5. Selectivity for carbon monoxide plus carbon dioxide (percent) (ethylene basis) | 0.8 | 1.0 | 1.0 | 1.0 | 0.8 |
| 6. Iron component contained in catalyst (weight percent) | 0.02 | 0.02 | 0.02 | 0.02 | 0.02 | 6. Iron component contained in catalyst (weight percent) | 0.65 | 0.52 | 0.55 | 0.71 | 0.69 |
| | | | | | | 7. Amount of disintegrated catalyst at random sampling (weight percent) | 2.4 | 0.5 | 0.2 | 0.3 | 0.1 |

EXAMPLE III

By employing the catalyst (Cu : Mg : Na=1 : 0.75 : 0.43) such as utilized in experiment 5 of example I, the relations between reaction temperatures and selectivities were further investigated in this example.

The previous data for temperatures of 220° C. and 280° C. were reaffirmed in these results.

TABLE 4

| Items for the conditions | Experiment number | | | | Items for the conditions | Experiment number | | | |
|---|---|---|---|---|---|---|---|---|---|
| | 16 | 17 | 18 | 19 | | 16 | 17 | 18 | 19 |
| | Reaction temperature °C. | | | | | Reaction temperature, °C. | | | |
| | 200 | 220 | 280 | 300 | | 200 | 220 | 280 | 300 |
| The conditions for the initial step of reaction: | | | | | The conditions after one month: | | | | |
| 1. Conversion rate of ethylene (percent) | 75.0 | 90.0 | 98.5 | 98.6 | 1. Conversion rate of ethylene (percent) | 63.2 | 80.8 | 98.5 | 98.5 |
| 2. Selectivity for 1,2-dichloroethane (percent) (ethylene basis) | 98.8 | 98.8 | 97.5 | 93.7 | 2. Selectivity for 1,2-dichloroethane (percent) (ethylene basis) | 88.8 | 98.0 | 97.5 | 93.0 |
| 3. Selectivity for ethylchloride (percent) (ethylene basis) | 0.2 | 0.2 | 0.1 | 0.1 | 3. Selectivity for ethylchloride (percent) (ethylene basis) | 10.2 | 1.0 | 0.2 | 0.2 |
| 4. Selectivity for other chlorides (percent) (ethylene basis) | 0.2 | 0.2 | 1.2 | 2.7 | 4. Selectivity for other chlorides (percent) (ethylene basis) | 0.2 | 0.2 | 1.2 | 3.1 |
| 5. Selectivity for carbon monoxide plus carbon dioxide (percent) (ethylene basis) | 0.8 | 0.8 | 1.2 | 3.5 | 5. Selectivity for carbon monoxide plus carbon dioxide (percent) (ethylene basis) | 0.8 | 0.8 | 1.1 | 3.7 |
| 6. Iron component contained in catalyst (weight percent) | 0.02 | 0.02 | 0.02 | 0.02 | 6. Iron component contained in catalyst (weight percent) | 0.51 | 0.69 | 1.31 | 2.06 |

With reference to the above-mentioned examples, the catalyst of Cu-Mg-Na-type (specifically the catalyst of experiments 5, 6 and 7 of example I, experiment 15 of example II and experiments 17, 18 and 19 of example III), insofar as the range of atomic ratio is maintained in accord with the invention indicated a favorable selectivity within a wide temperature range when compared with other types of catalyst and simultaneously, the said catalyst has obviously a stronger resistance against a disintegration as a result of the absorption of the iron salt as well as resistance against deterioration of the activity and the selectivity.

In subsequent tests the sodium component alone or the magnesium component alone was varied in the atomic ratio of the Cu, Mg and Na components, and the selectivity on a hydrogen chloride basis was examined. The following results were obtained:

Insofar as the present invention is concerned, a superior catalytic efficiency was confirmed in a similar manner as set forth in the above examples.

a. The Change of Sodium Component

| Atomic Ratio of Catalyst (Cu : Mg : Na) | Selectivity (%) (Hydrogen Chloride basis) |
|---|---|
| 1 : 0.66 : 0.1 | 98.1 |
| 1 : 0.66 : 0.2 | 98.5 |
| 1 : 0.66 : 0.4 | 98.8 |
| 1 : 0.66 : 0.7 | 98.7 |
| 1 : 0.66 : 0.9 | 98.2 | b. The Change of Magnesium Component

| Atomic Ratio of Catalyst (Cu : Mg : Na) | Selectivity (%) (Hydrogen Chloride basis) |
|---|---|
| 1 : 0.2 : 0.5 | 97.8 |
| 1 : 0.3 : 0.5 | 98.5 |
| 1 : 0.5 : 0.5 | 98.8 |
| 1 : 0.7 : 0.5 | 98.8 |
| 1 : 1.0 : 0.5 | 98.5 |
| 1 : 1.5 : 0.5 | 98.5 |
| 1 : 1.8 : 0.5 | 98.0 |

The reaction temperature in the above experiments was 260° C. and the other conditions were entirely similar to those in the above-mentioned examples.

Example IV

The catalyst was prepared by employing aluminum silicate as a carrier in accordance with the conventional process of immersion.

The aluminum silicate employed was a pellet having a diameter of 5 mm., a height of 6 mm. and a specific surface area of 350 m.$^2$/g. The composition of the prepared catalyst was made of $CuCl_2$; $MgCl_2$ and NaCl containing 4.90 percent by weight Cu, 1.13 percent by weight Mg and 0.62 percent by weight Na (Atomic ratio for Cu : Mg : Na=1 : 0.6 : 0.35).

The results of the test are indicated in the following table. The reaction temperature was 280° C. as the maximum temperature in the layers of catalyst. The other reaction conditions followed those of example I.

TABLE 5

| | |
|---|---|
| The conditions for the initial step of reaction: | |
| 1. Conversion rate of ethylene (percent) | 98.3 |
| 2. Selectivity for 1,2-dichloroethane (percent) (ethylene basis) | 97.5 |
| 3. Selectivity for ethylchloride (percent) (ethylene basis) | 0.1 |
| 4. Selectivity for other chlorides (percent) (ethylene basis) | 1.1 |
| 5. Selectivity for carbon monoxide plus carbon dioxide (percent) (ethylene basis) | 1.3 |
| 6. Iron component contained in catalyst (weight, percent) | 0.01 |
| The conditions after one month. | |
| 1. Conversion rate of ethylene (percent) | 98.0 |
| 2. Selectivity for 1,2-dichloroethane (percent) (ethylene basis) | 97.5 |
| 3. Selectivity for ethylchloride (percent) (ethylene basis) | 0.2 |
| 4. Selectivity for other chlorides (percent) (ethylene basis) | 1.0 |
| 5 Selectivity for carbon monoxide plus carbon dioxide (percent) (ethylene basis) | 1.3 |
| 6. Iron component contained in catalyst (weight, percent) | 1.19 |
| 7. Amount of disintegrated catalyst at random sampling (weight, percent) | 0.5 |

Having thus disclosed the invention, what is claimed is:

1. A process for the catalytic gas phase oxychlorination of ethylene which comprises reacting ethylene, hydrogen chloride and a member selected from the group consisting of air and oxygen in a reactor made principally of iron to produce 1,2-dichloroethane in the presence of a catalyst supported on an inert porous carrier, which catalyst consists essentially of copper chloride, sodium chloride and magnesium chloride in an atomic ratio Cu : Na : Mg of 1 : 0.2–0.7 : 0.3–1.5, and whereby the reaction temperature is maintained in the range of from about 220° C. to about 300° C.

2. A method according to claim 1 wherein a stainless steel reactor is employed.

3. A method according to claim 1 wherein the catalyst carrier is activated alumina.

4. A method according to claim 3 wherein the surface area of the carrier is from 150 to 400 square meters per gram.

5. A method as in claim 1 wherein the pressure is from 0 to 10 kilograms per square centimeter gauge.

* * * * *